(12) United States Patent
Buelow et al.

(10) Patent No.: US 10,000,176 B2
(45) Date of Patent: Jun. 19, 2018

(54) VEHICLE SEAT PART

(71) Applicant: Ford Global Technologies, LLC, Dearborn, MI (US)

(72) Inventors: Uwe Buelow, Leverkusen (DE); Eugen Riesen, Eitorf (DE); Michael Goesch, Hilden (DE); Felix Haenel, Cologne (DE); Martina Boeddeker, Leverkusen (DE); Chris Curtis, Leverkusen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/443,130

(22) Filed: Feb. 27, 2017

(65) Prior Publication Data

US 2017/0247010 A1    Aug. 31, 2017

(30) Foreign Application Priority Data

Feb. 29, 2016   (DE) .................. 10 2016 203 201

(51) Int. Cl.
| | |
|---|---|
| *B60R 21/2165* | (2011.01) |
| *B60N 2/58* | (2006.01) |
| *B60R 21/207* | (2006.01) |
| *B60R 21/231* | (2011.01) |

(52) U.S. Cl.
CPC ............ *B60R 21/2165* (2013.01); *B60N 2/58* (2013.01); *B60R 21/207* (2013.01); *B60R 21/23138* (2013.01); *B60N 2002/5808* (2013.01); *B60R 2021/23146* (2013.01)

(58) Field of Classification Search
CPC .............. B60R 21/207; B60R 21/2165; B60R 21/23138; B60R 2021/23146
See application file for complete search history.

(56) References Cited

U.S. PATENT DOCUMENTS

| | | | | |
|---|---|---|---|---|
| 5,967,546 | A | * | 10/1999 | Homier ................ B60N 2/5883 280/730.2 |
| 5,967,603 | A | | 10/1999 | Genders et al. |
| 6,045,151 | A | * | 4/2000 | Wu ........................ B60R 21/207 280/728.3 |
| 6,352,304 | B1 | * | 3/2002 | Sorgenfrei ............ B60R 21/207 280/730.2 |
| 7,669,889 | B1 | * | 3/2010 | Gorman ................ B60R 21/207 280/730.2 |
| 8,167,333 | B2 | | 5/2012 | Tracht et al. |
| 8,602,450 | B2 | | 12/2013 | Schnock et al. |
| 8,807,591 | B2 | * | 8/2014 | Nakata .................. B60R 21/207 280/728.3 |

(Continued)

FOREIGN PATENT DOCUMENTS

| | | |
|---|---|---|
| DE | 102011114777 A1 | 4/2013 |
| FR | 2940212 A3 | 6/2010 |

(Continued)

*Primary Examiner* — Faye M Fleming
(74) *Attorney, Agent, or Firm* — Frank A. MacKenzie; Bejin Bieneman PLC

(57) ABSTRACT

A vehicle seat part has a cover with a tear seam and an airbag module with an airbag and a force concentrator. The force concentrator partially surrounds the airbag. The concentrator has two end regions connected to the cover adjacent to and on opposing sides of the tear seam. One of the end regions is connected to the cover at a plurality of connecting portions spaced apart from one another.

20 Claims, 5 Drawing Sheets

(56) References Cited

U.S. PATENT DOCUMENTS

| | | | |
|---|---|---|---|
| 9,283,914 B2* | 3/2016 | Fujiwara | B60R 21/207 |
| 9,346,431 B1* | 5/2016 | Kim | B60R 21/2338 |
| 9,738,197 B2* | 8/2017 | Tanabe | B60R 21/207 |
| 9,744,934 B2* | 8/2017 | Lafferty | B60R 21/207 |
| 2008/0296941 A1* | 12/2008 | Bederka | B60R 21/207 |
| | | | 297/216.1 |
| 2010/0187798 A1* | 7/2010 | Deppe | B60R 21/201 |
| | | | 280/743.1 |
| 2015/0336528 A1* | 11/2015 | Tanabe | B60R 21/207 |
| | | | 280/728.2 |
| 2017/0008437 A1* | 1/2017 | Tanabe | B60N 2/68 |

FOREIGN PATENT DOCUMENTS

| | | | |
|---|---|---|---|
| FR | 2978712 A1 | 2/2013 | |
| JP | 2001088649 A * | 4/2001 | B60R 21/207 |
| WO | WO 2012105957 A1 | 8/2012 | |

\* cited by examiner

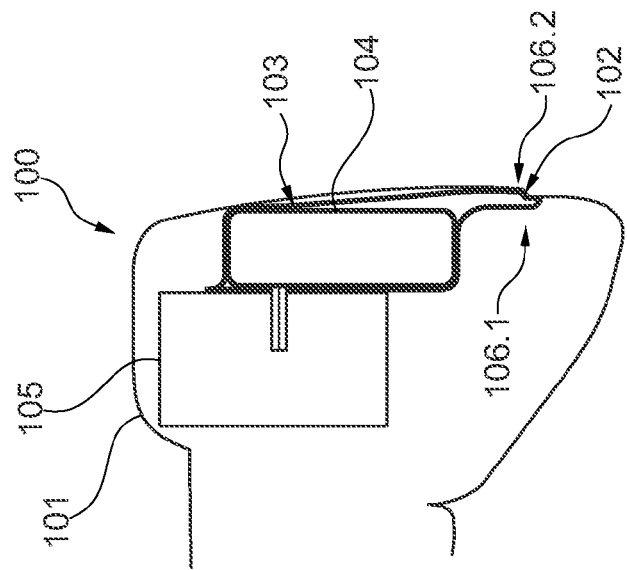
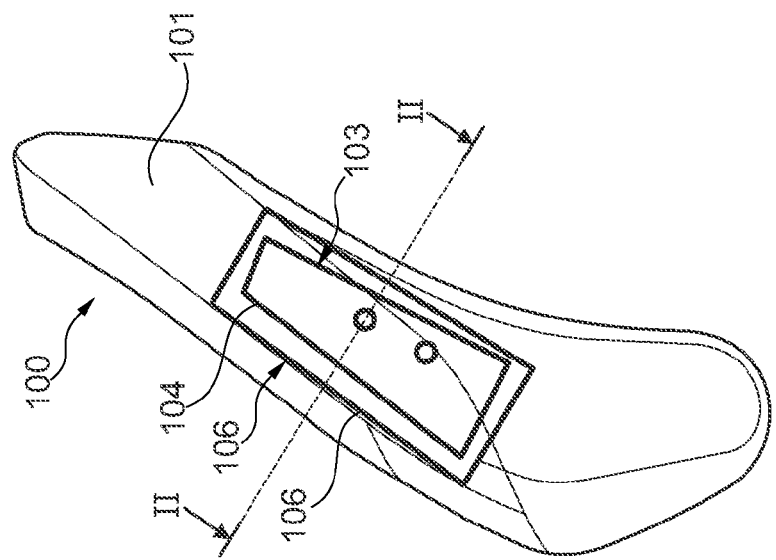
Fig. 1
Fig. 2

VEHICLE SEAT PART

CROSS-REFERENCE TO RELATED APPLICATIONS

This application claims foreign priority benefits under 35 U.S.C. § 119(a)-(d) to DE 10 2016 203 201.1 filed Feb. 29, 2016, which is herein incorporated by reference in its entirety.

BACKGROUND

In modern motor vehicles, airbags form part of the restraint systems which are present as standard equipment. The airbag may be a plastic bag which is connected to a gas generator which serves to inflate the airbag in an accident. The gas generator in turn is triggered via sensors which normally react to high acceleration values, as may be present in the event of accidents. For safety reasons, it is desirable that the inflation of the airbag takes place very rapidly, for example within 20-50 ms after the start of the accident. This may be achieved via pyrotechnical gas generators, and alternatively with cold gas generators or hybrid gas generators. In addition to front airbags which are accommodated in the steering wheel and/or in the dashboard in front of the driver or passenger, some vehicles are also provided with side airbags. Side airbags are deployed between the door cladding and the seat, and serve to protect the side of the occupant adjacent the door. The side airbag may be accommodated inside the seat, commonly in the seat backrest. For reasons including aesthetics, the side airbag may be concealed below a cover of the seat backrest which also covers the seat cushion. The cover may also be called an outer cover.

In the event of an accident, the airbag is forced through a tear seam of the outer cover provided therefor, deploying outwardly. Before deployment, the tear seam connects two parts of the outer cover. The tear seam is designed to tear in the presence of forces which act when the airbag is deployed. A concern is that the tear seam is located in a region which in spatial terms is relatively narrowly defined as regards the airbag, whilst said airbag attempts to expand in all directions. The latter is undesirable in that it may lead to the airbag being forced into the cushion body of the seat, for example, or a different region where it is ineffective in terms of safety. Even when the airbag is forced through the tear seam, an expansion in other directions may result in the expansion into the safety-relevant region between the door cladding and the seat being delayed, so that optimal protection of the occupant is no longer able to be ensured.

In order to counteract this, therefore, so-called force concentrators are used in order to deflect the expansion of the airbag in the direction of the tear seam and/or to concentrate the expansion force onto the tear seam. Such force concentrators normally predominantly surround the airbag and include a material having low expandability which counteracts the forces present during the expansion of the airbag. The force concentrator is opened in the direction of the tear seam, whereby a direction of expansion for the airbag is predetermined. In many cases, the ends of the force concentrator on opposing sides of the tear seam are connected (for example stitched) to the cover so that during the expansion they tear apart the cover at the tear seam and thus cause the tearing of the tear seam.

U.S. Pat. No. 6,045,151 A discloses a seat cushion subassembly comprising a cushion which is supported by a frame as well as a cover which surrounds this seat cushion sub-assembly and has at least one seam. An airbag is attached with an inflation unit to the frame and is partially covered by the cushion and the cover. A cover element covers the airbag in order to hold the airbag in a folded position. A seam of the cover is aligned with the airbag such that the airbag is able to tear this seam when deployed. An approximately tubular force concentrator surrounds the cover element and the airbag. The force concentrator includes a layered, flexible material which is able to resist the pressure of the airbag during inflation and is connected with two opposing ends to the cover, for example by stitching. When the airbag is inflated, the force is oriented in the direction of the seam by the force concentrator, so that said seam tears.

U.S. Pat. No. 5,967,603 A discloses a vehicle seat having a frame element, an airbag attached thereto and an outer cover which surrounds the frame element and the airbag and has a predetermined tear line. A force concentrator is connected to the outer cover in the vicinity of the predetermined tear line. The force concentrator has two parts made of material which is flexible but not expandable. Said parts have proximal ends which on opposing sides of the predetermined tear line are connected to the outer cover and extend therefrom below the outer cover in opposing directions to the distal ends. The two parts are fastened to one another at these distal ends by complementary fastening means, such that they form a sleeve enclosing the airbag and the frame member.

A device for a vehicle seat is disclosed in FR 2 940 212 A3, said device comprising at least one airbag module and a force concentrator which serves to deflect the airbag in a predetermined region. In this case, the force concentrator and the airbag module are arranged adjacent to a support structure and secured, for example, by a screw and nut. The force concentrator may include the same material as the airbag and has a predetermined tear seam, said force concentrator being secured by means of a hook and loop fastener in the vicinity of said tear seam to a foam block of the vehicle seat.

FR 2 978 712 B1 discloses a backrest of a vehicle seat having a side airbag. In this case, an airbag module and a force concentrator which are screwed to a support structure are also provided. The force concentrator which surrounds the airbag module in the manner of a jacket has two adjacent ends which are arranged in the vicinity of a predetermined tear seam of an outer sleeve of the vehicle seat. The aforementioned ends in this case are connected via rapid fasteners to the parts of the outer sleeve adjacent to the predetermined tear seam, wherein the rapid fasteners may be configured as hook and loop fasteners, hooks or buttons.

DE 10 2011 105 461 A1 discloses a vehicle seat having a structural part, a cushion body as well as a cover which covers the cushion body and which has two cover parts connected together in a tear seam. Moreover, an airbag module is received in an airbag pocket which serves as a force concentrator and which is fastened with its two ends in the region of the tear seam to the cover. In order to prevent the airbag from being forced into the cushion body, a protective strip made of flexible tear-resistant material is also fastened between the airbag pocket and the cover.

DE 10 2006 053 601 A1 discloses a vehicle seat device having a frame, a seat cushion arranged in the vicinity thereof as well as a cladding cover which has a seam on one side of the seat. Moreover, an airbag module is provided with an airbag. A housing, the airbag being able to expand therein and having a tear seam, is enclosed by a force concentrator with two panels. The ends of the panels are fastened to the seam of the cladding cover, whereby they exert a force on this seam when the airbag is triggered.

In view of the prior art set forth, the rapid and reliable deployment of an airbag accommodated inside a vehicle seat leaves further room for improvement.

SUMMARY

A vehicle seat part, in particular for a motor vehicle such as a truck or a passenger motor vehicle, is provided. The vehicle seat part forms in this case at least one part of a vehicle seat, for example a seat surface or a seat backrest. The vehicle seat part has a cover with a tear seam, an airbag module with an airbag, as well as a force concentrator at least partially surrounding the airbag, for deflecting an expansion force of the airbag toward the tear seam. The cover which may also be denoted as the outer cover, sleeve or cladding of the seat part, forms at least one part of the actual surface of the vehicle seat. The cover generally includes a layered, flexible material, for example fabric, leather, synthetic leather or the like. Embodiments are also expressly possible in which the cover includes a plurality of layers. The cover comprises a tear seam which may also be denoted as the predetermined tear seam. This seam is provided such that it tears according to plan when the airbag is triggered and thus opens up a through-opening for the airbag.

The term "seam" is not to be understood as limiting, in that it has to be a stitched connection, but here it could also theoretically be a connection produced in a different manner, for example bonded or welded, between two portions or parts of the cover, which is structurally weakened in comparison with the adjacent material, so that it tears according to plan in the event of a corresponding load.

The cover at least partially surrounds the airbag module and/or that said airbag module is arranged inside the cover or behind said cover. For reasons of comfort, the vehicle seat part generally also comprises a cushion body arranged inside the cover, for example made of foamed plastics material. In addition, sensors, heating elements or other components may also be arranged below the cover, i.e. on the vehicle seat, which however are not critical to this description.

Apart from the actual airbag, for example a gas generator and/or an airbag sleeve which simply serves for packaging the folded-up airbag and yields without any appreciable resistance when said airbag is triggered, may also form part of the airbag module. Alternatively, the gas generator may be arranged at some distance from the airbag, optionally even outside the seat part, and may be connected thereto via a connection line, whereby it would not be part of an airbag module in the narrower sense. Normally, however, the gas generator more or less directly adjoins the airbag. The gas generator may be configured as a pyrotechnical gas generator or as a hybrid gas generator in which gas is pyrotechnically released from a pressurized container. The airbag itself is configured in the known manner as a flexible tear-resistant bag and may include a plastics film or a textile material, for example a woven fabric, which in turn may be coated with a film.

The force concentrator, which may also be denoted as an expansion force concentrator, expansion guiding element or the like, serves to deflect the force and/or the pressure which the airbag creates when deployed, and the expansion associated therewith, in the direction of the tear seam. It could also be said that the function of the force concentrator is to concentrate this force in the region of the tear seam or to deflect the expansion of the airbag in the direction of the tear seam. To this end, the force concentrator which generally includes a material which is flexible but has relatively little elasticity, at least substantially surrounds the airbag. In a typical embodiment, the force concentrator is configured in the manner of a jacket or sleeve. It is possible that the force concentrator includes a material which may also be used for an airbag and/or includes the same material as the airbag.

The force concentrator has two end regions which are connected on opposing sides of the tear seam to the cover. The end regions may, for example, be ends of a strip of flexible material, the force concentrator consisting of said material. The one end region is connected relative to the tear seam on one side to the cover, whilst the other end region is connected on the opposing side to the cover. In a normal case, the tear seam connects two parts of the cover together so that each of the end regions is connected to just one of the two parts. Generally, the connection is provided in a region adjacent to the tear seam. The connection may be configured by a positive, non-positive and/or material connection. The connection does not have to be gas-tight but in any case it should be stronger than the connection represented by the tear seam. Thus it is ensured that when a force acts on the end region, this force acts via the aforementioned connection onto the cover and thus onto the tear seam, wherein the tear seam tears when a specific load is exceeded, whilst the connection between the end region and the cover ideally remains intact. It could be said that the cover is torn apart by the action of the force of the end regions of the force concentrator on the tear seam.

One end region may be connected to the cover only in a plurality of connecting portions spaced apart from one another along the tear seam. In other words, the at least one end region is not connected to the cover continuously along the tear seam but here there are connecting portions in which a connection is provided between the end region and the cover, and between two connecting portions in each case there is a portion without a connection, to a certain extent a "free", "unconnected" or "connection-less" portion. This means that the force concentration and/or the tearing apart of the tear seam takes place through the end regions of the force concentrator, as described above, initially only and/or primarily on the connecting portions. In this case it is provided that the yielding of the tear seam has its starting point in these connecting portions but then continues to the further unconnected portions. As a result, it may be possible to ensure that the tear seam tears more or less at the same time at a plurality of points, whereby the tearing may take place as a whole more rapidly and/or more uniformly, which in turn overall has a positive effect on the expansion of the airbag.

Advantageously, both end regions are connected to the cover only in the connecting portions spaced apart from one another along the tear seam. In other words, in the direction of extension of the tear seam, there are connecting portions in which both end regions are connected to the cover, and between two connecting portions in each case a (connection-less) portion in which neither of the two end regions is connected to the cover. This embodiment is advantageous in that a relatively symmetrical force acts on the tear seam, i.e. a pulling force which is exerted by the one end region is applied toward one side and a pulling force which is exerted by the other end region is applied toward the other side. In one portion where there is no connection between the cover and the force concentrator, a considerably lower force is applied on the tear seam which also—at least in terms of order of magnitude—may be regarded as symmetrical.

In particular, the at least one end region may be connected in at least two connecting portions to the cover. There are two connecting portions, a portion being arranged therebetween where no connection is provided between the end region and the cover. The two connecting portions may be arranged in particular in the direction of extent of the tear seam at the two ends of the end region. Alternatively, however, three, four or more connecting portions may also be provided, which also may be determined according to the respective application.

According to a preferred embodiment, each of the two connecting portions extends over 20 to 40% of the at least one end region. Further preferably, each of the connecting portions may extend over 30-35% of the at least one end region. This naturally refers to the extent of the end region in the direction of the tear seam. When, therefore, the connecting portions in the direction of the tear seam begin and/or end at the end of the end regions, for example a first connecting portion may extend over 30% of the end region and a second connecting portion may also extend over 30%, wherein a connection-less portion extends therebetween over 40% of the end region. It might also be conceivable that each of the portions takes up exactly one third of the end region. If the extent of one of the connecting portions is less than 20%, this may potentially lead to no effective force concentration at this point and the tear seam not tearing primarily here but only secondarily due to the tearing at a different point. If one or even both connecting portions extends over more than 40% of the end region, the deployment dynamics of the airbag is potentially similar to that in a system where the end regions are connected over the entire length to the cover. In principle, however, embodiments are also possible and may be effective where the extent of at least one connecting portion is outside the cited region. It is also possible, for example, to provide two or more connecting portions having a different extent.

Irrespective of the number of connecting portions, it is preferred that these portions extend as a whole over at most 80% of the end regions. If an even larger part of the end regions is taken up by the connecting portions, the deployment dynamics are potentially similar to those in a connection over the entire length, i.e. the advantages according to the arrangement described herein may be reduced.

The connection of the end regions to the cover may be implemented in different ways. Thus this may be carried out, for example, by bonding or welding. Advantageously, the end regions are stitched to the cover. This connecting method is appropriate in that both the force concentrator and the cover normally include layered, flexible materials which may be stitched together relatively easily in terms of process technology. Moreover, a very strong connection may be implemented by a seam which preserves the flexibility of the connected materials and also permits displacements of the materials relative to one another.

According to one embodiment, at least one end region between two connecting portions has an indented region which is set back from the tear seam. In other words, whilst the contour of the end region in the connecting portions is normally in line with the path of the tear seam, the contour in the indented region is set back from the tear seam, i.e. the end region here is at a greater distance from the tear seam. This means at the same time that here there is also a greater distance from the other end region and/or that the force concentrator has a larger hole here. By this measure the concentration of force onto the connecting portions is assisted and in the region located therebetween only a relatively low force is exerted on the tear seam. If an indented region is not provided between two connecting portions and the end region here is located in the vicinity of the tear seam, this may have the result in some cases that in spite of the absence of a connection between the end region and the cover a considerable force acts on the tear seam and thus the concentration of force onto the connecting portions is impaired.

The arrangement described herein may be used, in principle, for all airbag systems which are accommodated in vehicle seats, such as for example seat cushion airbags arranged in the seat surface. Preferably, however, the vehicle seat part is configured as a seat backrest, the tear seam being arranged thereon at the side. "At the side" naturally refers here to the viewing direction of an occupant on the vehicle seat. The airbag in this case is thus a side airbag which is provided to be deployed between the seat and the side wall and/or the door cladding.

It is possible to produce the force concentrator from a single piece, for example from a layered strip made of plastics material which surrounds the airbag, and the edges thereof form the end regions. According to a further embodiment, the force concentrator may include two parts, in each case an end region being formed thereon, and which are connected together on a side remote from the tear seam. The two parts may, for example, be material strips, films or the like. The connection of the two parts may, for example, be implemented by stitching, bonding, welding or other appropriate techniques. The connection does not necessarily have to be seamless but larger holes could result in the airbag expanding therein which would impair the effectiveness of the force concentrator.

According to one embodiment, the airbag may be fastened to a frame part of the vehicle seat part arranged inside the cover. The frame part may form part of a frame of the vehicle seat part which substantially lends the vehicle seat part its mechanical stability and, for example, includes metal, for example steel. In the case of a seat backrest, the frame also serves for the pivotable connection to the seat surface which in turn is connected (in a manner adjustable in its position) to the vehicle floor. The frame part may, in particular, be a sheet metal shaped part. Normally the entire airbag module including the gas generator is fastened to the frame part. This also encompasses embodiments in which the airbag is indirectly fastened to the frame part via the gas generator. The fastening may take place, for example, by a screw connection.

BRIEF DESCRIPTION OF THE DRAWINGS

FIG. 1 shows a side view of a seat backrest according to the prior art.

FIG. 2 shows a sectional view along the cutting line II-II in FIG. 1.

DETAILED DESCRIPTION

Figure 3:
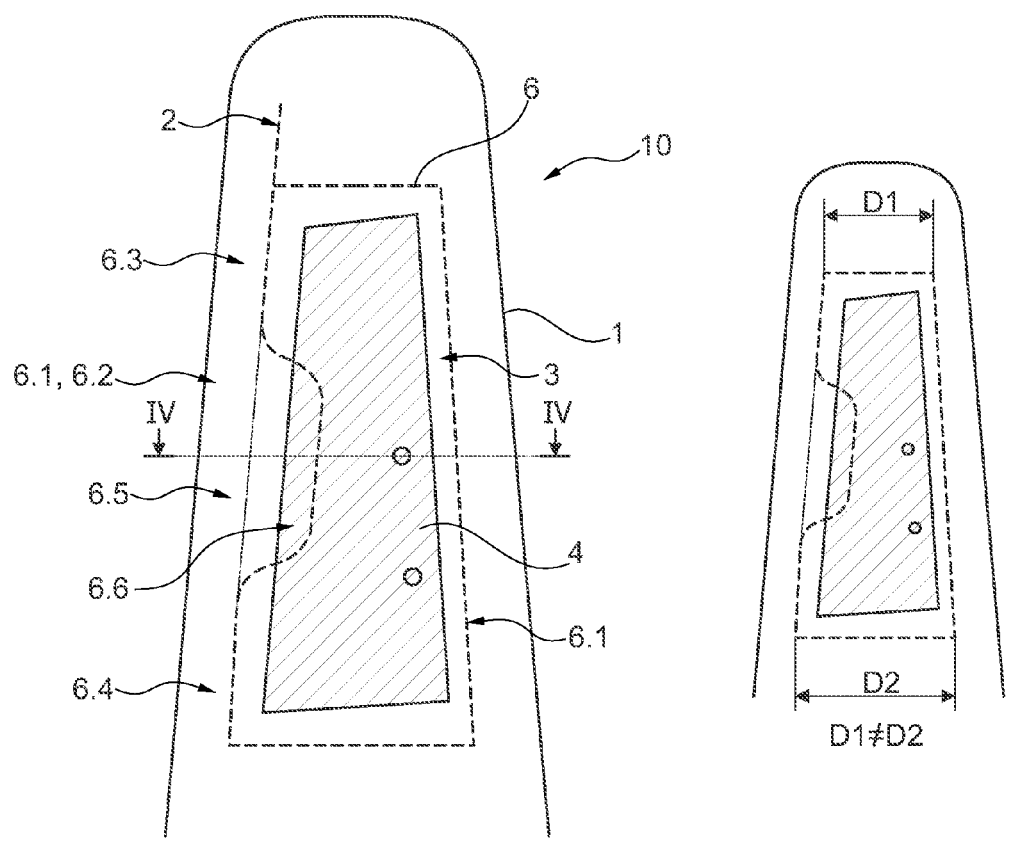
FIG. 3 shows a schematic view of a part of a seat backrest.

In the various figures the same parts are always provided with the same reference numerals, which is why these parts are only described once.

FIG. 1 and FIG. 2 show a seat backrest 100 for a motor vehicle according to the prior art, wherein FIG. 1 is a side view and FIG. 2 is a sectional view. An airbag module 103 with an airbag 104 and a gas generator, not shown here, is located at the side of the seat backrest 100 below a cover 101. The airbag module 103 is screwed to a frame part 105 which provides the seat backrest 100 with mechanical stability. The gas generator is located in the region of the screw connection. The airbag module 103 is surrounded by a jacket-like force concentrator 106 which has two end regions 106.1, 106.2. On opposing sides of a tear seam 102 of the cover 101 these end regions 106.1, 106.2 are connected to said cover. The force concentrator 106 includes the same material as the airbag 104, for example a synthetic fiber fabric which is coated with a silicone film. When the airbag 104 is triggered, an expansion thereof is limited and/or deflected by the force concentrator 106 surrounding it, and namely in the direction of the end regions 106.1, 106.2 and the tear seam 102.

FIG. 3 and FIG. 4 show the seat backrest 10. FIG. 3 shows a schematic side view of a part of the seat backrest 10, whilst FIG. 4 is a sectional view. The construction of the seat backrest 10 substantially corresponds to the seat backrest 100 of FIGS. 1 and 2. Thus also in this case an airbag module 3 with an airbag 4 is screwed to a frame part 5 and is partially surrounded by a jacket-like force concentrator 6. Also here, a gas generator, not shown, of the airbag module 3 is located in the region of the screw connection to the frame part 5. Cushion bodies 7, 8 made of foam are provided on both sides of the frame part 5 and the force concentrator 6, said cushion bodies providing the seat backrest 10 with the required shape and resilience. Also here, a cover 1 is stretched over the aforementioned parts 3-8, said cover having a tear seam 2. The tear seam 2 in the present case is stitched but also other connection methods are possible. As may be identified by way of example in FIG. 3 in the side view, the force concentrator 6 in the drawing plane tapers from bottom to top, i.e. a dimension and/or extent transversely to the tear seam 2 is greater in a lower region than in an upper region. In FIG. 3, for example, an upper edge in the drawing plane is smaller in its extent D1 than the extent D2 of the edge arranged below in the drawing plane. Thus the force concentrator 6 is able to be mounted in a particularly simple and easy manner. Naturally, the force concentrator 6 may also taper from top to bottom, viewed in the drawing plane.

The force concentrator 6 consists in the present case of two parts 6.7, 6.8 (FIG. 4A) which are connected together on a side remote from the tear seam 2 by a connecting seam 6.9. The force concentrator 6 has two end regions 6.1, 6.2 which are connected to the cover 1 on opposing sides of the tear seam 2, for example by stitching. However, the connection is only provided in partial regions, namely for example in two connecting portions 6.3, 6.4 (FIG. 3) which are arranged relative to the path of the tear seam 2 at the end of the end regions 6.1, 6.2 and extend approximately in each case over a third of the end regions 6.1, 6.2. A connection-less portion 6.5 is located therebetween in which the end regions 6.1, 6.2 are not connected to the cover 1. Here they also have an indented region 6.6 which is set back relative to the tear seam as is visible in FIG. 3.

Figure 4A:
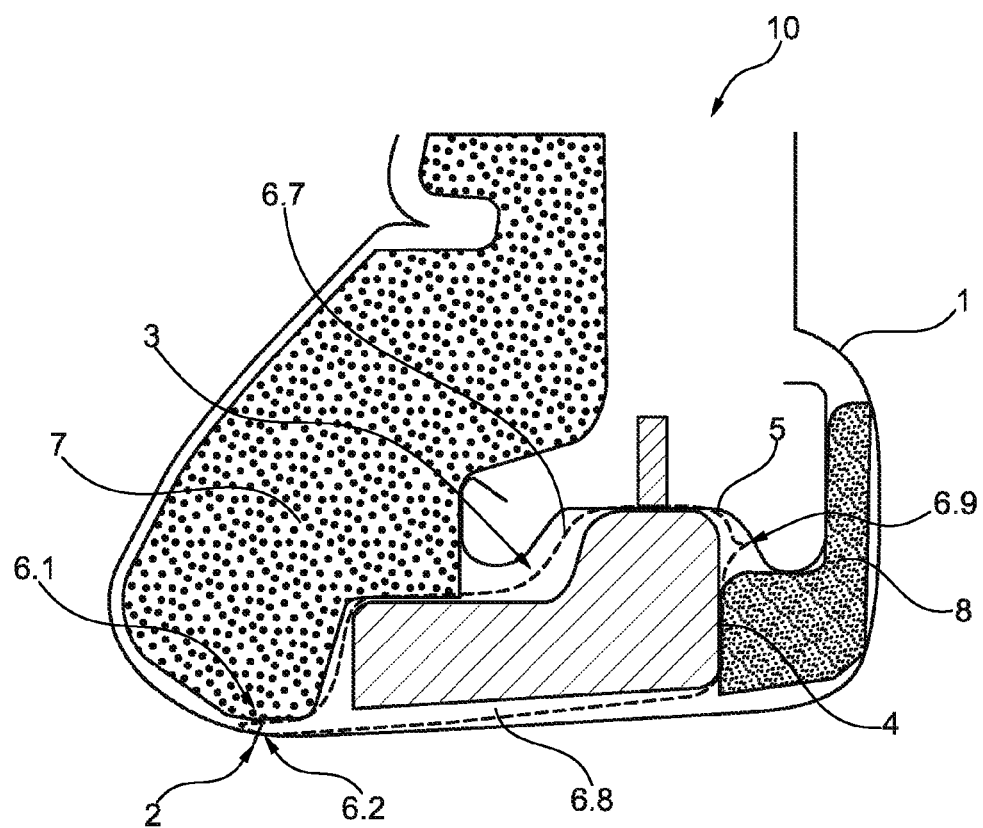
FIG. 4A shows a sectional view of the seat backrest along the cutting line IV-IV of FIG. 3.
Figure 4B:
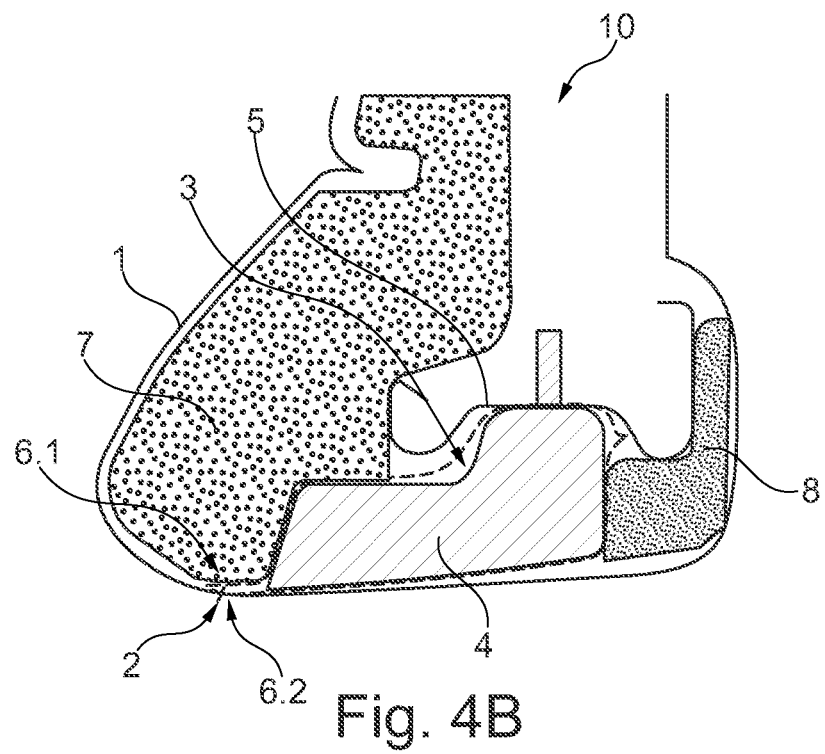
FIGS. 4B-4D show sectional views according to FIG. 4A which illustrate the sequence of an expansion process of an airbag.
Figure 4C:
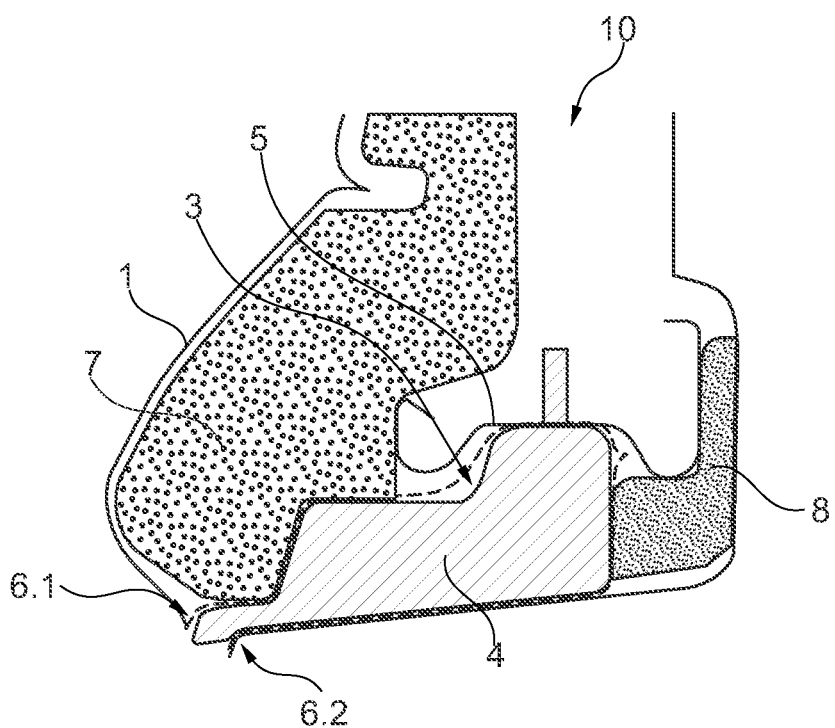
Figure 4D:
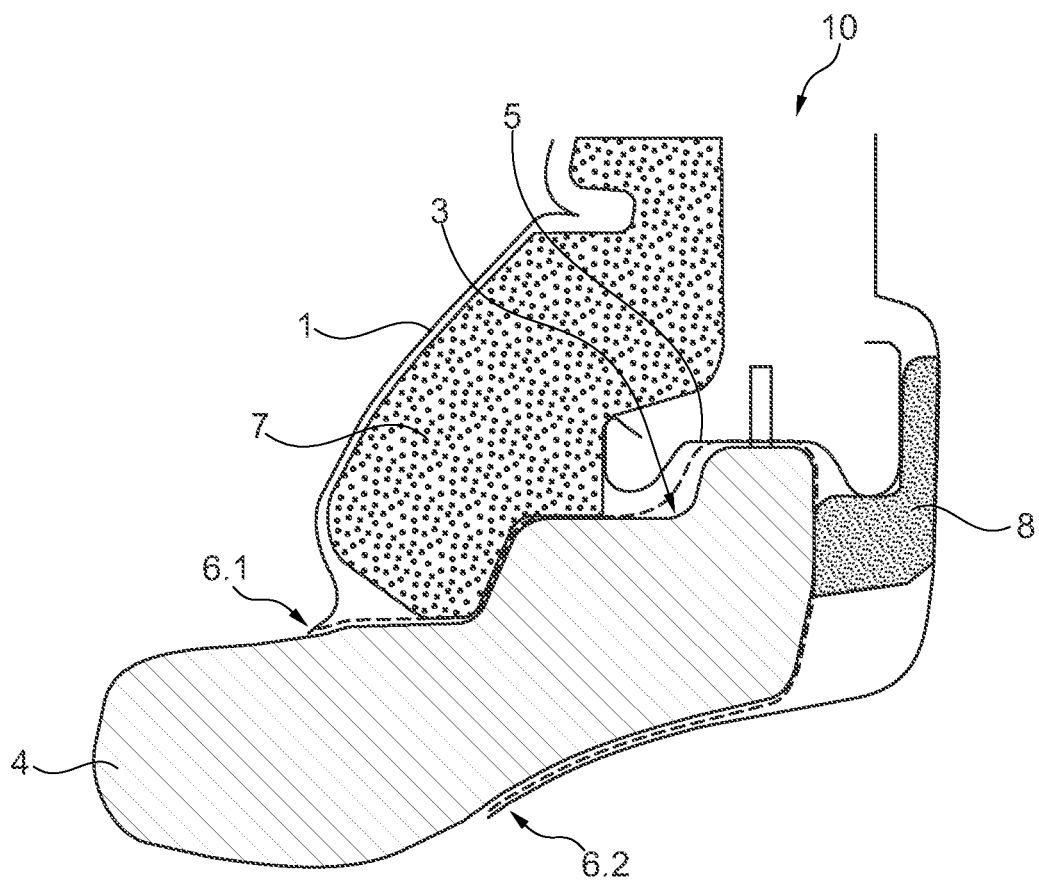

If the airbag module 3 is triggered, the airbag 4 initially starts to expand inside the force concentrator 6 until it substantially fills the airbag as shown in FIG. 4B. Whilst the force of the airbag 4 is not sufficient in order to tear the force concentrator 6 itself, via the connection to the cover 1 provided in the connection portions 6.3, 6.4 a tensile force is exerted on both sides of the tear seam 2, resulting in the tear seam ultimately yielding and/or tearing, as shown in FIG. 4C. In this case the tearing initially takes place (at the same time or rapidly in succession) in the region of the connecting portions 6.3, 6.4 and then continues into the connection-less region 6.3 located therebetween. Overall, this may lead to a more uniform and/or more rapid tearing of the tear seam 2 which accelerates the expansion of the airbag 4. After the airbag 4 has been forced into the tear seam 2, it expands unhindered outwardly as shown in FIG. 4D.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle seat part comprising:
   a cover having a tear seam;
   an airbag module having:
      an airbag; and
      a force concentrator at least partially surrounding the airbag and having two end regions connected to the cover on opposing sides of the tear seam and the end regions allowing deflection of an expansion force of the airbag against the tear seam and one of the end regions being connected to the cover at a plurality of connecting portions distributed along a path of the tear seam with the connecting portions spaced apart from one another along the tear seam by an unconnected portion.

2. The vehicle seat part of claim 1, wherein each of the end regions are connected to the cover at a plurality of connecting portions distributed along a path of the tear seam and spaced apart from one another along the tear seam by the unconnected portion.

3. The vehicle seat part of claim 1, wherein the plurality of connecting portions is two in number.

4. The vehicle seat part of claim 3, wherein the unconnected portion has an indented region which is set back from the tear seam.

5. The vehicle seat part of claim 3, wherein each of the two connecting portions extends from 20% to 40% of the respective end regions.

6. The vehicle seat part of claim 1, wherein the connecting portions extend as a whole over at most 80% of the end region.

7. The vehicle seat part of claim 1, wherein the end regions are stitched to the cover.

8. The vehicle seat part of claim 1, wherein said vehicle seat part is configured as a seat backrest and the tear seam is arranged thereon at the side.

9. The vehicle seat of claim 1, wherein the force concentrator includes two parts with one of the end regions being formed on each of the parts, and the parts being connected by a seam on a side remote from the tear seam.

10. The vehicle seat of claim 1, wherein the airbag is fastened to a frame part of the vehicle seat part inside the cover.

11. A vehicle seat part comprising:
    a cover having a tear seam;
    an airbag module having:
       an airbag; and
       a force concentrator partially surrounding the airbag with two end regions connected to the cover adjacent to and on opposing sides of the tear seam and one of the end regions being connected to the cover at a plurality of connecting portions distributed along a path of the tear seam with the connecting portions spaced apart from one another by an unconnected portion.

12. The vehicle seat part of claim 11, wherein each of the end regions are connected to the cover at a plurality of connecting portions distributed along a path of the tear seam and spaced apart from one another by the unconnected portion.

13. The vehicle seat part of claim 12, wherein the plurality of connecting portions is two in number for each end region.

14. The vehicle seat part of claim 13, wherein the unconnected portion has an indented region which is set back from the tear seam.

15. The vehicle seat part of claim 13, wherein each of the connecting portions extends from 20% to 40% of the respective end regions.

16. The vehicle seat part of claim 12, wherein the connecting portions extend as a whole over at most 80% of the respective end regions.

17. The vehicle seat part of claim 12, wherein the end regions are stitched to the cover.

18. The vehicle seat part of claim 12, wherein said vehicle seat part is configured as a seat backrest and the tear seam is arranged thereon at the side.

19. The vehicle seat of claim 12, wherein the force concentrator includes two parts with one of the end regions being formed on each of the parts, and the parts being connected by a seam on a side remote from the tear seam.

20. The vehicle seat of claim 12, wherein the airbag is fastened to a frame part of the vehicle seat part inside the cover.

* * * * *